United States Patent Office 3,349,912
Patented Oct. 31, 1967

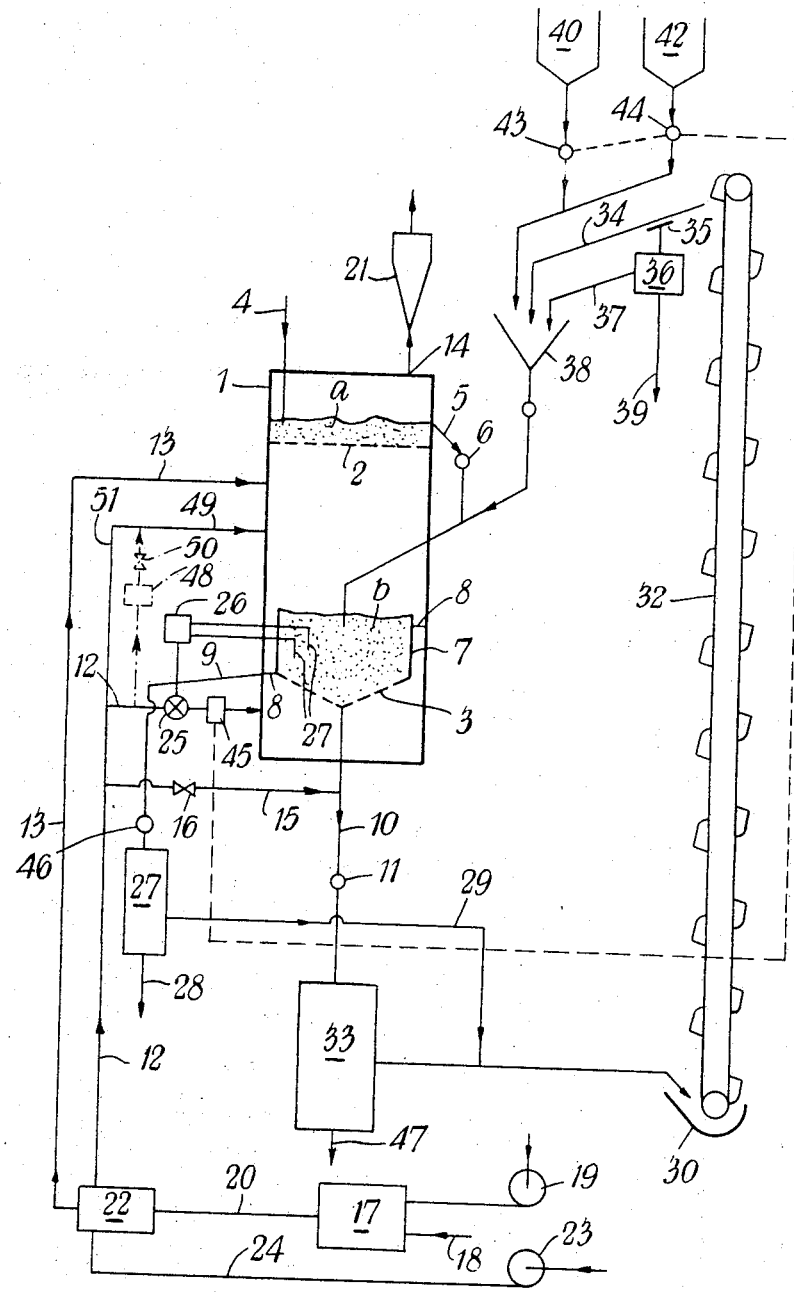

3,349,912
FLUIDIZED BED SEPARATOR
Geoffrey Frank Eveson, Sheffield, and George Thomas Richards, Sudbury, Wembley, Middlesex, England, assignors to Head, Wrightson & Company, Limited, Thornaby-on-Tees, England, a corporation of Great Britain
Filed Oct. 12, 1964, Ser. No. 399,294
8 Claims. (Cl. 209—474)

This invention concerns improvements relating to the treatment of particulate material to separate components of different specific gravities. The invention is applicable to the cleaning of small or fine coal, or other particulate material, containing components of different specific gravities.

In the specification belonging to our United States Patents Nos. 3,261,463 dated July 19, 1966 and 3,388,282, dated Nov. 29, 1966, we have described continuous processes of cleaning impure small or fine coal, or other particulate material, having components of different specific gravities, comprising delivering the said coal or other particulate material into a fluidized bed or beds of discrete solid particles, maintaining the bed or beds in fluidised condition by a heated or unheated gaseous medium applied thereto in uniform or pulsed manner to give, and retain in, the bed or beds a specific gravity effective to cause separation of the particulate material into two or more fractions of different specific gravities, freeing the thus separated fractions from such of the discrete solid particles as discharge with them from the process and recirculating such discharged particles to the bed or beds.

In these processes, the discrete solid particles may, in certain cases, be derived from a definite specific gravity fraction of the particulate material under treatment or they may be obtained from a completely different source. In this manner, it is possible to define a given separating medium as belonging to one or other of two categories namely autogenous and exogenous.

It is obvious in many cases that both autogenous and exogenous media will, in use, become contaminated with particles of different specific gravity derived from the material under treatment.

Any change in the proportion of contaminants, or in the specific gravity composition of those contaminants, results in a corresponding change in the mean specific gravity of the circulating discrete solid particles. However, within limits, a substantially constant effective specific gravity of the fluidised separating medium can be maintained by controlled variation of the mass flow rate of fluidising gas to suit changes in the mean specific gravity of the circulating discrete solid particles. For example, the gas mass flow rate would be increased when the mean specific gravity increased and decreased when the mean specific gravity decreased. However, there are limits (imposed by the considerations such as the maximum permissible viscosity of the separating medium and the necessity for securing operating conditions resulting in the formation of a fluidised separating medium having the required degree of homogeneity) to the extent to which the mass flow rate of gas can be varied; these, in turn, determine the limits between which the mean specific gravity of the circulating discrete solid particles may be permitted to vary as a result of change in the proportion of contaminants, or in the specific gravity composition of these contaminants, or in both of these factors simultaneously.

The effective specific gravity of the fluidised separating medium may be adjusted not only by (a) change in the mass flow rate of fluidising gas as just stated, but also by
(b) change in the particle size of the discrete solid particles, or
(c) change in the mean specific gravity of the discrete solid particles, or
(d) any practicable combination of two, or more, of these above three factors.

Methods and apparatus (e.g. screens, dry magnetic separators, air (or, more generally, gas-elutriators or combustion equipment)) which are applicable for maintaining the circulating discrete solid particles in a satisfactory condition have been discussed in the specifications accompanying our United States Patent No. 3,261,463 dated July 19, 1966, and application Ser. No. 324,448 filed Nov. 18, 1963.

With either an autogenous, or an exogenous, separating medium, the proportion or contaminating particles can be controlled with reasonable precision in this manner, but the specific gravity composition of these contaminating particles is, generally, not controlled. When the material treated contains particles differing widely in specific gravity, it becomes difficult to control the mean specific gravity of the discrete solid particles simply by controlling the proportion of contaminants.

An object of the present invention is to provide new or improved means of enabling control of the mean specific gravity of the discrete solid particles to be exercised in a ready and more reliable manner and at the same time allowing a wide range of mean specific gravities to be achieved.

According to this invention, such control is carried out by use of a so-called "mixed medium," i.e. an exogenous medium composed of controlled proportions of two, or more, materials of markedly different specific gravity.

According to another feature of the invention, and in cases where a certain amount of contaminating particles (derived from the raw material under treatment) must, generally, be accepted, such particles are kept in controlled proportion by suitable means for instance such as have already been mentioned above.

Suitably, the mixed medium is compounded from particles of two or more of the following namely sand, magnetite and ferrosilicon.

In the following example, the use of the mixed media to achieve different effective specific gravities of the fluidised separating medium was applied in a laboratory-scale version of the cleaning stage of apparatus according to our patent applications aforesaid. In these experiments, the mass flow rate of fluidising gas and the depth of the fluidised bed were maintained constant. The relative proportions of the discrete particles of magnetite (size 100–300 B.S. mesh; sp. gr.=4.67); ferrosilicon (size 240 B.S. mesh—0; sp. gr.=7.0) and sand (size 100–300 B.S. mesh; sp. gr.=2.65) required to achieve different effective specific gravities for the fluidised separating medium, were measured. The results may be summarised as follows:

| Effective specific gravity | Percent by weight | | | Mean sp. gr. of discrete solid particles |
|---|---|---|---|---|
| | Sand | Magnetite | Ferrosilicon | |
| 1.4 | 24.3 | 75.7 | Nil | 3.94 |
| 1.68 | 1.0 | 99.0 | Nil | 4.64 |
| 1.80 | Nil | 70.8 | 29.2 | 5.17 |
| 2.0 | Nil | 32.8 | 67.2 | 6.01 |

The efficiency with which a given raw feed material may be separated into, say, two fractions of different specific gravity depends upon, amongst other factors, the degree of homogeneity of the gas-fluidised separating medium. Particularly in cases where it is desirable to be able to alter the specific gravity of separation within relatively wide limits (e.g. 1.4–2.0, it is preferable to utilise relatively small changes in the mass flow rate of fluidising gas, in conjunction with controlled changes in the specific gravity composition of the discrete solid particles (mixed media), rather than to employ large changes in the mass flow rate of fluidising gas in conjunction with discrete solid particles of constant specific gravity.

A fluidised bed is characterised by the high degree of mixing which occurs in both the radial and longitudinal directions. Therefore, it is easy to obtain a fluidised bed, the effective specific gravity of which is sensibly constant throughout the whole of its volume, when using a mixed medium, provided that the size range of each component of the mixed medium is selected with some care. For example, to facilitate intimate mixing the mean particle size of the denser component of a two-component, mixed medium should be somewhat less than that of the less dense component.

Regarding the main advantages of the use of the "mixed medium," the fluidised bed or beds of discrete solid particles should be as homogeneous as possible in order that, in the or each bed, the raw feed material may be separated into two fractions, of different specific gravity, with acceptable precision. There is a limited range of mass flow rate of fluidising gas over which the necessary degree of homogeneity can be achieved. Too great a mass flow rate can result in the formation of large gas bubbles within the fluidised bed; too low a mass flow rate can result in the formation of a homogeneous fluidised bed but having an apparent viscosity which is too high. In either case, the precision with which te raw material is separated can fall to an unacceptably low level.

For discrete solid particles of any one material, the limited range of gas mass flow rate which can be used ensures that a correspondingly limited range of effective specific gravity of the or each fluidised bed can be achieved. The approximate effective specific gravity range for three materials are:

| Material | Particle size (B. S. mesh) | Density (g./ml.) | Effective specific gravity range (approximate) |
|---|---|---|---|
| Sand | 100–300 | 2.65 | 1.1–1.4 |
| Magnetite | 100–300 | 4.67 | 1.7–2.2 |
| Ferrosilicon | 240–0 | 7.0 | 2.6–3.3 |

To obtain fluidised beds having a continuous spectrum of effective specific gravity over the range, say 1.1 to 3.3, whilst still producing the necessary degree of homogeneity of the fluidised bed, it is possible:

(a) to utilise a series of pure materials (three of which may be sand, magnetite and ferrosilicon), each material enabling a portion of specific gravity range to be covered, or (b) to utilise pure materials, and mixtures of controlled portions of two or more of these materials.

It will be apparent that the second method, involving the use of so-called "mixed media," is to be preferred.

Within the above discussion of the main advantages of the use of a "mixed medium" according to this invention, no reference has been made to the presence, within the circulating discrete solid particles, of contaminating particles derived from the raw feed material. Generally, such contaminating particles will always be present. However, it is believed that their presence in an otherwise pure material (e.g. sand) does not enable the contaminated material to be regarded as a "mixed medium," as defined in the present specification, since control of the proportion and specific gravity of the contaminants is less readily effected than is the control of the proportions and specific gravities of the components of a true "mixed medium."

In order that the invention may be readily understood, reference is directed to the accompanying drawing which is a schematic diagram of one example of apparatus for carrying the invention into effect.

The apparatus shown in the drawing is for drying and cleaning particulate material such as impure small or fine coal having components of different specific gravities. The apparatus embodies a generally cylindrical fluidising vessel 1 having perforate supports 2 and 3. Particulate material for treatment is fed continuously at 4 on to the support 2 and is formed into a fluidised bed $a$ for the purpose of drying and de-dusting. The support 2 is flat and extends over the whole cross-sectional area of the vessel 1.

On the support 3 a fluidised bed $b$ of discrete solid particles is formed to serve as a separating or cleaning medium for the dried and de-dusted material which is transferred from bed $a$ to bed $b$ by overflowing into external duct 5 containing rotary gas seal 6. The bed $b$ is, as will be described, arranged to have a controlled effective specific gravity intermediate between those of the relatively low-density and high-density components of the particulate material and is effective to clean said particulate material i.e. to separate the particulate material into fractions of different specific gravities. The perforate support 3 is of inverted conical form and is formed of porous material (e.g. ceramic) the pores of which constitute the perforations. To contain the bed $b$ a cylindrical side wall 7 extends upwardly from the periphery of the base of the cone, the side wall 7 and support 3 forming a container for the bed $b$ which is separated from the inside surface of the vessel 1 by an annular space. The top of the bed $b$ is open and the "floats" product, i.e. the relatively low density component of the particulate material together with some of the bed material overflows the whole top edge of the side wall 7 into a launder 8 which extends helically from the top of the side wall 7 to one or more take-off points connecting with duct 9. The "sinks" product is discharged from bed $b$ into downpipe 10, containing gas-tight valve 11, through the apex of the conical support 3.

To fluidise the bed $b$ gas under pressure is fed to the underside of support 3 through gas feed line 12. In this example hot gas is being used, but it will be appreciated that unheated gas may be used. The fluidising gas fed to the underside of bed $b$ through line 12 may be a continuous supply or a pulsed supply as will be appreciated by those skilled in the art. After passing through the bed $b$ the fluidising gas passes through bed $a$ and assists hot gas supplied through gas feed line 13 in fluidising bed $a$. The hot gas fluidising bed $a$ serves to dry the particulate material forming the bed $a$ and entrains dust particles in its passage through the bed $a$. The hot gas and entrained dust particles pass out of the vessel at 14 and are fed to cyclone separator 21 where the dust particles are separated out, the gas then exhausting to atmosphere.

To enable the "sinks" product to be continuously discharged without large quantities of the material forming the bed, a further supply of gas under pressure is led into the down pipe 10 through feed line 15. The gas is fed through line 15 at a rate controlled by valve 16 to prevent, by an elutriating action, the discharge with the "sinks" product through the pipe 10 of all but an acceptably small quantity of the material forming bed $b$.

The gas supply for feed line 13 is combustion gases derived from combustion furnace 17 having a fuel supply indicated by 18 and a blower 19. The hot combustion gases from the furnace 17 flow through line 20 to heat exchanger 22, and from there, whilst still retaining a large proportion of their heat to line 13. The gas supply for feed line 12 and feed line 15, which is shown as a branch from line 12 although it could be a quite separate air supply, is derived from blower 23, which supplies air via line 24 to the heat exchanger 22 where it heat exchanges with the combustion gases from furnace 17 and thence passes into the feed line 12. 51 is a by-pass line for air not passed along lines 12 and 15. Monitoring means, which may be of known form, can be employed for maintaining the temperatures of the gas supplies within predetermined limits.

The mass flow rate of fluidising gas fed to beneath support 3 is controlled by valve 25 which is in turn controlled by controller 26 in dependence upon the effective specific gravity of the bed $b$ as measured by the two dip tubes 27 located at different depths in the bed $b$. The control of the mass flow rate of fluidising gas in this manner is further explained later in the specification.

In order that the particulate material forming bed $b$ may be de-dusted efficiently at a pre-determined particle size, the mass flow rate of the fluidising gas for bed $a$ is kept constant by suitable monitoring equipment which may be of known form.

The particulate material overflowing bed $b$ into duct 9 together with bed material passes through rotary gas seal 46 on to a screen 27. At the latter, the oversize product which will consist mainly, or wholly, of "floats" product, is discharged at 28 while the undersize product consisting of bed material contaminated with finely divided particles of the "floats" product is passed via 29 to the boot 30 of bucket elevator 32. The material passing through pipe 10 and valve 11 similarly passes on to a second screen 33, from which the undersize product passes to the boot 30 of bucket elevator 32, whilst the oversize product is discharged at 47.

Material is discharged at the top of the elevator 32 on to a chute 34 in the base of which is hinged a sliding door 35. Adjustment of the position of this door enables a portion, or the whole of the material to pass to a dry magnetic separator 36 if desired. The magnetic product (normally this will be magnetite which is a known bed material) is passed at 37 to hopper 38 for return to the fluidising bed $b$. The non-magnetic product is passed from the separator at 39 for disposal. The portion of the material by-passing the magnetic separator is passed by the chute 34 into the hopper 38. Two bunkers 40 and 42 containing different fluidised bed materials are provided and these supply fluidised bed materials to the hopper 38 through feed control devices 43 and 44. In the example of operation of the apparatus to be discussed the bunker 40 contains magnetite and the bunker 42 ferrosilicon in appropriately sized fractions. The devices 43 and 44 are in turn controlled through mass flow rate indicator 45 (as indicated by the broken line in the drawing) in a manner to be described in order to maintain a suitable exogenous mixed medium as the fluidised bed.

In operating the above described apparatus for cleaning coal, let it be assumed that a fluidised bed having an effective specific gravity of 2.2 is required and that tests have shown that this specific gravity can be achieved using a mixture of 25 percent of magnetite and 75 percent of ferrosilicon. Let it also be assumed that the necessary degree of uniformity of the fluidised bed of discrete solid particicles can be obtained provided that the mass flow rate of fluidising gas lies within the limits 100–120 lbs. per hour per square foot of the perforate support 3 for the fluidised bed $b$.

The amount of the mixed medium initially fed to the hopper 38 need not be much in excess of that required to establish the fluidised bed $b$ and the circulation circuit to and from the bed $b$ and the rate of circulation may be such that any one particle completes the circuit in about 5 minutes; in a commercial size plant the amount of mixed medium will be several tons. Initially therefore the feed control devices 43 and 44, which may be for example rotary seals or electromagnetically vibrated feeders are set so that they deliver from the bunkers 40 and 42 the 25 percent and 75 percent of magnetite and ferrosilicon respectively to the hopper 38.

Assume now that with such a mixed medium a fluidised bed having a desired specific gravity of 2.2 is established with a mass flow rate of fluidising gas of 110 lbs. per hour per square foot of perforate support 3. The effective specific gravity of the fluidised bed $b$ may fluctuate from the desired value for any one or combination of more than one of the following reasons:

(a) change in the mean particle size of the magnetite or ferrosilicon or both,
(b) change in the specific gravity of the magnetite or ferrosilicon or both forming the bed at any particular time, due to being commedcial quality materials,
(c) change in relative proportions of magnetite and ferrosilicon in the mixed medium; this may be caused, for example by disproportionate removal of one component of the mixed medium with the 'sinks' and 'floats' products,
(d) change in the proportion and/or mean specific gravity of contaminating particles derived from the particulate material being treated.

The effective specific gravity of the fluidised bed will decrease with decrease in (a) and (b), with decrease in the proportion of ferrosilicon and with (in the case of coal cleaning) increase in the proportion of, and decrease in the mean specific gravity of, contaminating particles. Conversely, the specific gravity of the fluidised bed will increase with increase in (a) and (b), with increase in the proportion of ferrosilicon and with (in the case of coal cleaning) decrease in the proportion of, and increase in the mean specific gravity of, contaminating particles.

If the dip tubes 27 detect an increase in the specific gravity of the fluidised bed above the desired value of 2.2, the controller 26 causes the valve 25 to open sufficiently so that, with the resultant increase mass flow rate of fluidising gas, the specific gravity is caused to return to the desired value. Conversely, if the sensing device detects a decrease in the specific gravity of the fluidised bed, the valve 25 is caused to close sufficiently for the specific gravity to return to the desired value. Relatively small fluctuations in the measured specific gravity (say ±0.2) from the desired value caused by variations in any one or more of the four factors listed above, can be corrected automatically by adjusting the mass flow rate of fluidising gas whilst still keeping this mass flow rate within the permissible range 100–120 lbs. per hour per sq. ft. of perforate support 3. Conversely if it is necessary to change, by adjustment of the specific gravity controller 26, the effective specific gravity of the fluidised bed by not more than, say 0.2 specific gravity units above or below the value of 2.2, this change can be brought about automatically solely by adjustment of the mass flow rate of fluidising gas, it being assumed that the physical characteristics of the circulating particles of the mixed medium remain constant.

Assume now that a condition is reached where, in order to maintain the specific gravity at 2.2, it has been necessary automatically to reduce the mass flow rate of gas to, just below 100 lbs. per hour per sq. ft. of perforate support 3. As the indicator 45 moves below this lower control limit, a control signal automatically actuates valve feed control device 43 and/or feed control device 44 to decrease the feed of magnetite and/or increase the feed of ferrosilicon by amounts, which can be pre-set or, if desired, made proportional to the rate at which the indicator 45 is moving towards zero. This automatic action causes an increase in the proportion of ferrosilicon in the circulating discrete solid particles which, in turn requires an increased mass flow rate of gas to produce a fluidised bed having an effective specific gravity of 2.2. As soon as the mass flow rate has increased above the lower control limit of 100 lbs. per hour per sq. ft. of perforate support 3, the devices 43 and 44 automatically revert to their original settings which causes the mixture feed to hopper 38, to contain 25 percent of magnetite and 75 percent of ferrosilicon.

If, in order to maintain the specific gravity of the fluidised bed at 2.2, it has been necessary auttomatically to increase the mass flow rate of fluidising gas to, or just above, 120 lbs. per hour per sq. ft. of perforate support 3, as the indicator 5 moves above this upper control limit a control signal automatically adjusts device 43 and/or device 44 to cause an increase in the proportion of magnetite in the circulating discrete solid particles, which in turn requires a decreased mass flow rate of fluidising gas to produce an effective specific gravity of 2.2. As soon as the indicated means flow rate has decreased below the upper control limit of 120 lbs. per hour per sq. ft. of perforate support 3, the devices 43 and 44 revert to their original settings.

It is obvious that the control system just described has an equally important application if it is necessary to change the effective specific gravity of the suspension by more than 0.2 specific gravity units above or below the postulated value of 2.2. For the sake of simplicity of description, assume that the physical characteristics of the circulating particules of the mixed medium remain constant.

To change the effective specific gravity to a value below 2.0 would necessitate increasing the mass flow rate of fluidising gas above the desirable upper limit of 120 lb. per hr. sq. ft. of perforate support 3. As the indicator, 45, moves above this upper control limit, a control signal automatically adjusts device 43 and/or device 44 to cause an increase in the proportion of magnetite in the circulating discrete solid particles, which in turn requires a decreased mass flow rate of fluidising gas to produce an effective specific gravity of less than 2.0. As soon as the indicated mass flow rate has decreased below the upper control limit of 120 lb. per hr. per sq. ft. of perforate support, 3, the devices 43 and 44 revert to their original settings.

To change the effective specific gravity to a value above 2.4 would necessitate decreasing the mass flow rate of fluidising gas below the permissible lower limit of 100 lb. per hr. per sq. ft. of perforate support, 3. As the indicator, 45, moves below this lower control limit, a control signal automatically adjusts device 43 and/or device 44 to cause a decrease in the proportion of magnetite in the circulating discrete solid particles, which in turn requires an increased mass flow rate of fluidising gas to produce an effective specific gravity of more than 2.4. As soon as the indicated mass flow rate has increased above the lower control limit of 100 lb. per hr. per sq. ft. of perforate support, 3, the devices 43 and 44 revert to their original settings.

It may be convenient to equip the hopper 38 with upper and lower level controllers which, by automatic control of the devices 43 and 44, ensure that the necessary minimum amount of discrete solid particles is present in the circuit whilst also ensuring that an excessive amount is avoided.

The short residence time of any particle of the discrete solids in the circuit ensures that the above described automatic system for governing the relative proportions of magnetite and ferrosilicon is acceptably effective. The automatic speed control for devices 43 and 44 can be refined utilising well-known instrumentation and control equipment techniques. Obviously the system can be extended to cater for say discrete solid particles composed of a mixture of three or more components.

As has been stated above the gas supply to the underside of the support 3 may be a pulsed supply. In the drawing the method of effecting this has been shown in chain-dot lines. The device 48 comprises a rotary or reciprocating valve unit which cyclically opens and closes by-pass path 49 through valve 50. Thus during the half cycles when by-pass path 49 is closed air flows to beneath the support 3.

We claim:
1. Process for treating particulate material to separate components of different specific gravities, comprising delivering the particulate material into a fluidised bed consisting of an exogenous medium composed of discrete solid particles of at least two materials of markedly different specific gravities, maintaining said fluidised bed in a fluidised condition by a gaseous medium applied to the underside of said bed, the mass flow rate of said gaseous medium being varied to control the effective specific gravity of said fluidised bed whereby said particulate material is separated into two fractions of different specific gravities, one said fraction of said particulate material having a specific gravity greater than the effective specific gravity of said fluidised bed and sinking through said bed and the other said fraction of said particulate material having a specific gravity less than the effective specific gravity of said bed and floating on said bed, and varying the proportions of the different materials forming said exogenous medium when the mass flow rate of said gaseous medium reaches a value outside predetermined limits to render said fluidised bed again controllable by said gaseous fluidising medium having a mass flow rate within said predetermined limits.

2. Process according to claim 1, wherein the proportions are varied by a predetermined amount.

3. Process according to claim 1, wherein the proportions are varied by an amount dependent upon the rate at which the effective specific gravity of said fluidised bed is varying.

4. Process according to claim 1, wherein said fluidised bed is included in a circuit around which said exogenous medium is continuously circulated, and wherein the said proportions of the components of said exogenous medium are varied at a position remote from said fluidised bed.

5. Process according to claim 4, wherein said exogenous material is treated at a point remote from said fluidised bed to control the proportion of said particulate material contaminating said exogenous medium.

6. Fluidised bed apparatus for treating particulate material to separate it into two fractions of relatively high and low specific gravities which sink through and float on said fluidised bed respectively, comprising a fluidising vessel, a perforate support in said vessel, a bed supported on said perforate support and consisting of an exogenous medium composed of discrete solid particles of at least two materials of markedly different specific gravities, means for supplying gaseous medium to the underside of said perforate support for fluidising said bed, valve means for controlling the mass flow rate of said gaseous medium, bunkers, each containing a respective component of said exogenous medium, feed control devices for controlling the feed of said components from said bunkers on to the perforate support, detecting means for detecting changes in the effective specific gravity of said fluidised bed, a controller responsive to changes in said effective specific gravity as detected by said detecting means and arranged to actuate said valve means to vary the gas mass flow rate, indicator means for measuring the gas mass flow rate and arranged when the gas mass flow rate is beyond a predetermined limit to cause actuation of at least one of said feed control devices, whereby to vary the proportion of the components of said exogenous medium forming said bed.

7. Apparatus according to claim 6, and having a conveying circuit external to said fluidising vessel by which exogenous medium discharged from said fluidising vessel is recirculated to said fluidising vessel said conveying circuit being disposed to receive said components from said bunkers.

8. Apparatus as claimed in claim 7, wherein separator means are provided in said conveying circuit for separating said particulate material contaminating said exogenous medium from said exogenous material.

References Cited

UNITED STATES PATENTS

| | | | |
|---|---|---|---|
| 2,007,190 | 7/1935 | Fraser | 209—474 |
| 2,139,047 | 12/1938 | Tromp | 209—172.5 |
| 2,140,899 | 12/1938 | Davidson | 209—172.5 X |
| 2,206,574 | 7/1940 | Pearson | 209—172.5 |
| 2,430,762 | 11/1947 | Erck | 209—172.5 |
| 3,031,074 | 4/1962 | Osawa | 209—172.5 X |
| 3,093,577 | 6/1963 | Wilmot | 209—172.5 |

FRANK W. LUTTER, *Primary Examiner.*